United States Patent
Kudlacik

[11] 3,822,389
[45] July 2, 1974

[54] LIQUID COOLANT PRESSURIZING DEVICE FOR DYNAMOELECTRIC MACHINES

[75] Inventor: Henry W. Kudlacik, Schenectady, N.Y.

[73] Assignee: General Electric Company, Schenectady, N.Y.

[22] Filed: Aug. 24, 1972

[21] Appl. No.: 283,391

[52] U.S. Cl. .................................. 310/53, 310/59
[51] Int. Cl. ............................................. H02k 9/00
[58] Field of Search ............ 310/53, 54, 55, 56, 64, 310/58

[56] References Cited
UNITED STATES PATENTS

| | | | |
|---|---|---|---|
| 2,675,493 | 4/1954 | Grobel | 310/53 |
| 2,970,232 | 1/1961 | Kilbourne | 310/53 |
| 2,988,656 | 6/1961 | Grobel | 310/53 |
| 2,999,945 | 9/1961 | Heller | 310/53 |
| 3,089,045 | 5/1963 | Derks | 310/53 |
| 3,089,969 | 5/1963 | Wiedemann | 310/55 |
| 3,122,668 | 2/1964 | Cuny | 310/55 |
| 3,348,081 | 10/1967 | Willyoung | 310/55 |

Primary Examiner—R. Skudy
Attorney, Agent, or Firm—John F. Ahern; James W. Mitchell

[57] ABSTRACT

A gas-cooled, liquid-cooled dynamoelectric machine, in one embodiment, includes a gas supply connected to a liquid coolant storage tank for providing a temporary static pressure increase throughout a liquid coolant system in response to transient dynamoelectric machine overload conditions. Overload conditions are detected by an electrical or thermal sensor connected to a valve actuator connected between the gas supply and the storage tank. The increase in the static pressure raises the boiling point of the liquid coolant throughout the liquid coolant system thereby increasing the heat removal capability of the liquid coolant system. Upon the cessation of the overload, the static pressure in the liquid coolant is reduced to its normal, steady-state, operating pressure.

6 Claims, 1 Drawing Figure

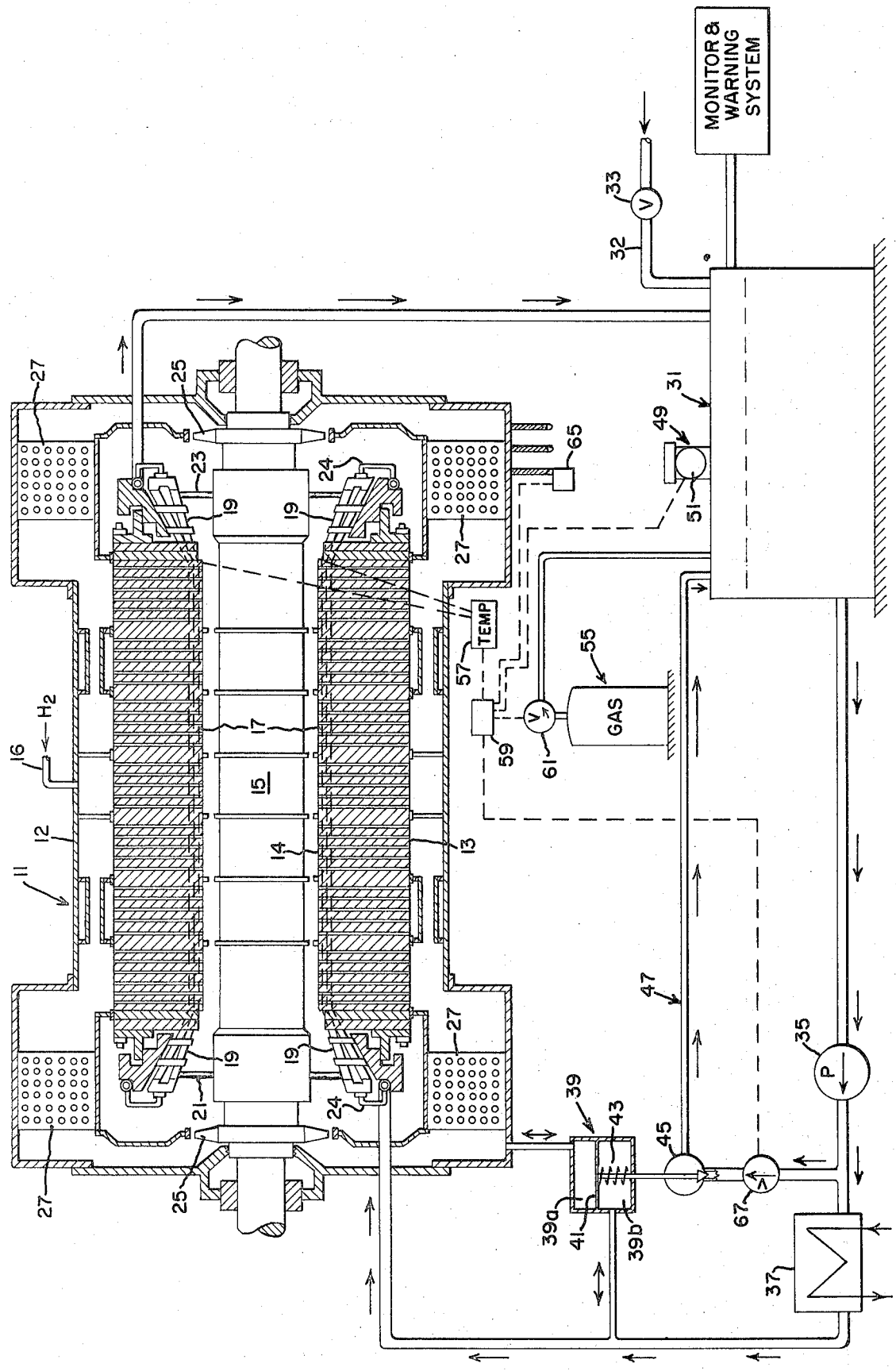

LIQUID COOLANT PRESSURIZING DEVICE FOR DYNAMOELECTRIC MACHINES

BACKGROUND OF THE INVENTION

This invention relates generally to gas-cooled, liquid-cooled dynamoelectric machines and, in particular, this invention describes means for providing a temporary static pressure increase in the liquid coolant system in response to dynamoelectric machine overload conditions.

In large dynamoelectric machines, various parts of the machine may be cooled by a pressurized gas coolant comtained within the gas-tight casing of the dynamoelectric machine. Still other parts of the dynamoelectric machine may be further cooled by a liquid coolant which is circulated through those parts. For example, the stator core windings may be hollow, electrically conductive bars through which a liquid coolant is circulated in a closed system. Such a system is shown in U. S. Pat. No. 3,348,081 to Willyoung issued Oct. 17, 1967 and assigned to the assignee of the present invention. The liquid coolant, often used, is water and it is necessary to take precautions against liquid coolant vaporization or "boiling." If the liquid coolant boils, it blocks the path of liquid coolant through the conduit resulting in further boiling or vaporization in that conduit, thereby causing a runaway situation.

In some dynamoelectric machines, a protective device is utilized for detecting leaks in the liquid coolant system. Such a device is described in U.S. Pat. No. 2,675,493 to Grobel issued Apr. 13, 1954 and assigned to the assignee of the present invention. According to the patented invention, the liquid coolant pressure is maintained lower than the gas coolant pressure, so that, if a leak should occur, the gas will leak into the liquid coolant rather than the liquid leaking into the dynamoelectric machine. Thereafter, the gas entrained in the liquid coolant system is detected by a gas monitor and warning system. The obvious advantage of the device is, that in the event of a leak, damage to the dynamoelectric machine will be minimized.

It is well known, that, in the aforementioned closed, liquid coolant system, the boiling point of the liquid coolant (water) may be raised by increasing the static pressure throughout the liquid coolant system to increase its heat removal capability. One disadvantage of increasing the static pressure in the liquid coolant system is that it increases the possibility of failure in the liquid connector joints and hoses. Another undesirable effect of increasing the static pressure in the liquid coolant system is that the total liquid coolant pressure may exceed the gas coolant pressure resulting in the loss of the previously cited leak detection system. The alternative would be to increase the gas coolant pressure in the dynamoelectric machine casing but this too may have well known undesirable consequences.

The use of leak detection systems therefore requires that the total liquid pressure of the liquid coolant system, i.e., the static pressure and the pump pressure, shall be less than the gas coolant pressure. However, it is not necessary to continuously monitor the liquid coolant system for leaks and it may be advantageous during periods of transient overload to temporarily increase the liquid coolant static pressure even if the total liquid coolant pressure exceeds the gas coolant pressure. Such an increase in liquid coolant static and therefore total pressure may temporarily disrupt the leak detection system but would result in attaining a higher overload capability in the dynamo-electric machine. Since the static pressure increase is only temporary, it will not appreciably increase the chance of failure in the liquid coolant system connectors and hoses and it will enable the "rating" of the dynamoelectric machine to be increased without increasing the size of the dynamoelectric machine. Further, upon cessation of transient overload conditions, the normal total operating pressure may be restored to the liquid coolant system and thereby reinstate the leak detection system.

A somewhat analogous system has been proposed in U. S. Pat. application No. 276,586, filed for D. Willyoung on July 31, 1972 and assigned to the assignee of the present invention. In that application, the cooling capacity of the liquid coolant system is temporarily increased during transient overload conditions by rapidly increasing the quantity of liquid coolant in the liquid coolant system in response to an overload sensing means. The increased quantity of liquid coolant is provided from a pressurized "surge tank" which has been added to the aforedescribed liquid coolant system.

In U. S. Pat. No. 2,970,232, to Kilbourne issued Jan. 31, 1961 and assigned to the assignee of the present invention, there is disclosed a pressurized liquid coolant system for a gas-cooled, liquid-cooled generator. In that patent it is generally recognized that increasing the liquid coolant pressure will raise the "boiling" point of the liquid coolant in the system. However, the patent does not include a leak detection device, nor is it particularly responsive to transient overload conditions. Further, it is primarily directed toward ensuring adequate liquid cooling to both a rotor and stator core which require different operating pressures to maintain adequate cooling.

In U. S. Pat. No. 3,122,668 issued Feb. 25, 1964 to Cuny, an "arrangement for indicating leakage between cooling systems of turbo-generators" is disclosed. In this patent, the liquid coolant is oil, saturated with a gas coolant; part of the invention being that the liquid coolant system is initially pressurized but the gas coolant pressure always exceeds the liquid coolant pressure. Further, no means are provided for triggering a pressure increase during transient overload conditions.

It is therefore one object of the present invention to provide a liquid coolant system responsive to transient, dynamoelectric machine overload conditions.

It is another object of the present invention to increase the overload capability of a dynamoelectric machine without increasing its size.

It is another object of the present invention to increase the overload capability of a dynamoelectric machine while still generally retaining the aforementioned leak detection system.

Other objects and advantages will become apparent from the following description of one embodiment of the present invention; and, the novel features will be particularly pointed out hereinafter in the claims.

SUMMARY OF THE INVENTION

In a gas-cooled, liquid-cooled dynamoelectric machine, means are provided for sensing transient overload conditions and other means are provided for temporarily increasing the static pressure throughout the liquid coolant system in response thereto. The increase in the static pressure in the liquid coolant system raises the boiling point of the liquid coolant and thereby increases the heat removal capability of the liquid coolant. In accordance with the present invention, a liquid coolant storage tank (part of the dynamoelectric machine cooling system) is connected to a gas supply tank which is, in turn, triggered by an overload sensing means. Upon the occurrence of a transient overload condition, gas is released into the liquid supply tank and thereby increases the static liquid coolant pressure throughout the entire liquid coolant system. If a leak detection device is incorporated into the liquid coolant system, it will be temporarily disrupted. Upon the cessation of the overload, the liquid coolant pressure will be reduced to its normal, steady-state operation by venting or evacuating the gas released into the liquid coolant supply tank. Thereupon, the leak detection device will be reinstated.

BRIEF DESCRIPTION OF THE DRAWING

The drawing shows a side elevation view of a gas-cooled, liquid-cooled dynamoelectric machine having a schematic drawing of a liquid coolant system superposed thereon according to the present invention.

DETAILED DESCRIPTION OF THE INVENTION

The drawing shows a dynamoelectric machine such as a turbine-generator 11 including a gas-tight casing 12 having a stator core 13 disposed therein. The stator core is formed with an axial bore 14 in which the generator rotor 15 is disposed. The generator casing is gas-cooled by the introduction of a gas coolant (usually hydrogen) through a gas inlet 16 communicating at one end with the interior of the generator casing and connected at the other end to a gas supply (not shown).

Hollow, electrically and fluidly conductive, stator bars 17 are axially disposed within slots formed in the stator core and terminate, at either end, in end windings 19. The end windings are also fluidly and electrically conductive and are fluidly connected to a liquid coolant inlet ring 21 and a liquid coolant outlet ring 23 by hose connectors 24. Other stator core, liquid coolant systems are available which lend themselves to the present invention. Gas coolant is circulated throughout the generator casing by a pair of fans 25 which are fixed on the generator rotor and the gas is cooled by heat exchangers 27 positioned at either end of the generator casing. All of the foregoing is known in the prior art and may be varied according to the prior art.

Liquid coolant (normally water) is supplied to the generator in the following manner, described and illustrated by the flow direction arrows. A liquid coolant storage tank 31, which is normally two-thirds full, is supplied with make-up water through inlet pipe 32 and valve 33 which communicates with a water supply (not shown). Water is pumped from the storage tank by means of pump 35 through a heat exchanger 37 which may be cooled by river water. Thereafter water purifying elements, e.g., filters, deionizers or demineralizers may be included in the system where needed. Finally the pumped liquid coolant supply enters the inlet side of the generator in communication with the liquid coolant inlet ring 21. At the outlet end of the generator, water which has passed through the stator core (stator bars) and into the liquid coolant outlet ring 23 is transported out of the generator to the liquid coolant storage tank.

A leak detection system, in accordance with the prior art, may be established as follows. For operation it is required that the gas coolant pressure, inside the generator casing 12, be higher than the total liquid coolant pressure. One way in which the gas pressure will be maintained higher than the total liquid pressure is by means of a different pressure regulator 39 comprising an upper chamber 39a and a lower chamber 39b separated by a diaphragm 41 which is biased by a compressed coil spring 43. Gas coolant is bled from the generator casing into the upper chamber, while liquid coolant is bled from the liquid coolant system into the lower chamber; the pressure of the gas coolant is countered by the spring constant pressure applied to the diaphragm and the total liquid coolant pressure. If the total liquid pressure increases, it will cause the valve 45, which is operative with the pressure regulator, to raise and bleed off liquid coolant which is recirculated back to the storage tank through a recirculating loop 47 thereby decreasing the total liquid pressure.

The storage tank 31, includes a vent 49 having a closure means 51 positioned therein operative when the storage tank is pressurized. Additionally, gas evacuation means (not shown) may be provided, in communication with the storage tank and vent, for evacuating the pressurized gas from the storage tank, if necessary. Also, in the storage tank, there is an outlet above the liquid level, which leads to the gas monitoring and warning system. If a leak occurs, gas coolant will leak into the liquid coolant system because of the pressure differences, and then the gas permeated liquid coolant would be detected in the gas monitor and warning system shown schematically as monitoring the liquid storage tank. Once the leak has been detected, steps may be taken for repair.

In combination with the foregoing, the present invention further includes means for detecting dynamoelectric machine overload conditions; and, means, responding to the detected overload condition, for increasing the static pressure in the liquid coolant system and thereby increase its capacity to absorb and reject additional heat without causing boiling within the system. The system may be pressurized by mechanical means such as a piston force applied within the liquid coolant system. However, the preferred embodiment is in the form of a gas tank 55 which is in communication with the storage tank. During periods of misoperation, the gas tank pressurizes the storage tank and hence, the static liquid pressure at every point in the liquid coolant system is increased by the same amount. Since pressure is equalized throughout the entire system, the pump capacity need not be changed.

Gas pressurization may be manually controlled, by an operator, upon a readout of transient overload conditions within the dynamoelectric machine. However, again, according to the preferred embodiment of the present invention, pressurization of the liquid coolant system occurs automatically upon a signal from a sensing means which will detect the overload condition. One such sensing means may be temperature-sensitive, such as a number of thermocouples located at the outlet end of each bar and represented by a box 57 marked "temp." in the drawing. The thermocouples will signal a valve actuator 59 which is connected to a control valve 61 on the gas tank. The signal connections are represented by dashed lines.

The sensing means may also be electrically responsive to current overloads such as detected in an armature current transformer 65, from which a signal may be sent to the valve actuator 59.

Besides controlling the valve 61 on the gas tank 55, the valve actuator 59 may also be used to control a valve 67 in the recirculating loop and the closure means 51 in the vent 49 of the liquid coolant storage tank. Upon the opening of gas tank valve 61, the valve actuator may operate to close the valve 67 and closure means 51.

The operation of the invention in view of the preceding drawing and description should be apparent. To further illustrate and explain the present invention, assume the liquid coolant is water. Under normal, steady-state operating conditions, water discharges from the dynamo-electric machine at slightly above atmospheric pressure (14.7 psia) and 80°C. Under these conditions, water will boil at 100° C. If, however, the system is pressurized to 39.2 psia, the water will boil at 130°C. Since the water enters at 46°C, this would represent an increase of overload capability of approximately $[(130 - 46/100 - 46) - 1]100 = 55$ percent.

Referring once again to the drawing, the system will operate under normal conditions so that the gas pressure is higher than the total liquid pressure, at any point, as determined by the pressure regulator 39. When overload conditions occur, it will be sensed by the temperature sensing means (thermocouples) or by the electrical sensing means monitoring the armature current transformer. An electrical signal from either of these sensing means will be sent to the valve actuator causing gas to pressurize the liquid coolant storage tank while closing the valve 67 and the vent 49. Under these conditions, the leak monitoring system will be interrupted. The system will remain pressurized during the overload condition, and upon restoration of normal steady-state operation, the pressurizing gas will be vented from the system and the leak monitoring system will be reinstated.

While there has been shown what is considered to be the preferred embodiment of the invention, it is, of course, understood that other modifications may be made therein. Such modifications may include adapting the system to a liquid-cooled rotor or pressurizing the storage tank, when required, and the dynamoelectric machine from the same gas source. It is intended to cover all such modifications as fall within the true spirit and scope of the invention

What is claimed is:

1. A dynamoelectric machine including a gas tight outer casing filled with a gas coolant and liquid cooled electrically conductive dynamoelectric machine parts wherein the gas coolant pressure exceeds the liquid coolant pressure during normal, steady-state operating conditions; a liquid coolant system for circulating liquid coolant through said dynamoelectric machine parts and a liquid coolant storage tank; said dynamoelectric machine further comprising:
    means connected to said liquid coolant storage tank for pressurizing the liquid coolant system;
    sensing means for detecting dynamoelectric machine overload conditions; and,
    means interconnecting said sensing means and said fluid pressuring means for triggering said pressurizing means in response to said dynamoelectric machine overload conditions.

2. The dynamoelectric machine recited in claim 1 wherein the pressurizing means includes a gas supply, including a valve, connected to said liquid coolant storage tank.

3. The dynamoelectric machine recited in claim 2 wherein the triggering means includes a valve actuator connected to said sensing means and said gas supply valve.

4. The dynamoelectric machine recited in claim 1 wherein the sensing means is temperature responsive and includes at least one thermocouple located at the liquid coolant outlet end of the dynamoelectric machine.

5. The dynamoelectric machine according to claim 1 wherein the sensing means is responsive to electric current.

6. The dynamoelectric machine according to claim 1 wherein the liquid-cooled dynamoelectric machine parts are stator bars.

* * * * *